United States Patent
Li et al.

(10) Patent No.: US 10,453,457 B2
(45) Date of Patent: Oct. 22, 2019

(54) METHOD FOR PERFORMING VOICE CONTROL ON DEVICE WITH MICROPHONE ARRAY, AND DEVICE THEREOF

(71) Applicant: Beijing Xiaoniao Tingting Technology Co., LTD., Beijing (CN)

(72) Inventors: Bo Li, Beijing (CN); Shasha Lou, Beijing (CN)

(73) Assignee: Beijing Xiaoniao Tingting Technology, Co., Ltd., Beijing (CN)

( * ) Notice: Subject to any disclaimer, the term of this patent is extended or adjusted under 35 U.S.C. 154(b) by 31 days.

(21) Appl. No.: 15/848,908

(22) Filed: Dec. 20, 2017

(65) Prior Publication Data

US 2018/0182392 A1 Jun. 28, 2018

(30) Foreign Application Priority Data

Dec. 23, 2016 (CN) .......................... 2016 1 1204155

(51) Int. Cl.
*G10L 15/22* (2006.01)
*G06F 3/00* (2006.01)
(Continued)

(52) U.S. Cl.
CPC .............. *G10L 15/22* (2013.01); *G10L 15/34* (2013.01); *G10L 21/02* (2013.01);
(Continued)

(58) Field of Classification Search
CPC ........... G06F 12/00; G06F 17/00; G06F 17/30
See application file for complete search history.

(56) References Cited

U.S. PATENT DOCUMENTS 9,513,157 B2 * 12/2016 Cohen ...................... H04S 1/00
2004/0066941 A1   4/2004 Amada et al.
(Continued)

FOREIGN PATENT DOCUMENTS

CN   103002171 A   3/2013
CN   103606374 A   2/2014
(Continued)

OTHER PUBLICATIONS

Supplementary European Search Report in European application No. 17209210.8, dated Apr. 19, 2018.
(Continued)

*Primary Examiner* — Shreyans A Patel
(74) *Attorney, Agent, or Firm* — Mintz Levin Cohn Ferris Glovsky and Popeo, P.C.; Kongsik Kim; Jhongwoo Jay Peck (57) ABSTRACT

A method and device for performing voice control on a device with a microphone array are disclosed. The method includes the following steps. It is confirmed that the device is in an audio playing state. An interference sound interfering the device in the audio playing state is analyzed. A voice enhancement mode adopted by the device is selected according to a feature of the interference sound. A user's voice is detected in real time for a wake-up word, and when the wake-up word is detected, the device is controlled to stop audio playing. An interference sound interfering the device after playing audios is stopped is analyzed, and the voice enhancement mode adopted by the device is adjusted according to a feature of the interference sound. A command word from a user is acquired to control the device to execute a corresponding function, to respond to the user.

20 Claims, 4 Drawing Sheets

(51) Int. Cl.
*G10L 21/02* (2013.01)
*G10L 15/34* (2013.01)
*G10L 21/034* (2013.01)
*H04R 1/32* (2006.01)
*H04R 1/40* (2006.01)
*H04R 3/00* (2006.01)
*G10L 21/028* (2013.01)
*G10L 21/0216* (2013.01)
*G10L 15/08* (2006.01)
*G10L 21/0208* (2013.01)

(52) U.S. Cl.
CPC ........ *G10L 21/0205* (2013.01); *G10L 21/028* (2013.01); *G10L 21/034* (2013.01); *H04R 1/326* (2013.01); *H04R 1/406* (2013.01); *H04R 3/005* (2013.01); *G10L 21/0216* (2013.01); *G10L 2015/088* (2013.01); *G10L 2015/223* (2013.01); *G10L 2021/02082* (2013.01); *G10L 2021/02166* (2013.01)

(56) References Cited

U.S. PATENT DOCUMENTS

2009/0138507 A1* 5/2009 Burckart .............. G11B 27/105

2014/0358535 A1* 12/2014 Lee ..................... G10L 15/22
  704/233
2015/0006176 A1* 1/2015 Pogue ................. G10L 15/22
  704/249
2015/0379992 A1* 12/2015 Lee ..................... G10L 15/22
  704/275
2017/0278515 A1 9/2017 Lee et al.

FOREIGN PATENT DOCUMENTS

| CN | 103871408 A | 6/2014 |
| CN | 204390737 U | 6/2015 |
| CN | 105045122 A | 11/2015 |
| CN | 105575398 A | 5/2016 |
| CN | 205354646 U | 6/2016 |
| CN | 106782585 A | 5/2017 |
| EP | 2816554 A2 | 12/2014 |

OTHER PUBLICATIONS

First Office Action corresponding to Chinese Patent Application No. 201611204155.2 dated Jul. 26, 2019, 19 pages.

* cited by examiner

METHOD FOR PERFORMING VOICE CONTROL ON DEVICE WITH MICROPHONE ARRAY, AND DEVICE THEREOF

CROSS-REFERENCE TO RELATED APPLICATION

The application claims priority to Chinese Application No. 201611204155.2 filed on Dec. 23, 2016, which is incorporated herein by reference.

TECHNICAL FIELD

The disclosure relates to the field of voice interaction technologies, and in particular to a method for performing voice control on a device with a microphone array and a device with a microphone array.

BACKGROUND

With the development of intelligent technology, many manufactures start to consider setting a voice recognition function on intelligent products, for example, computers, mobile phones, home appliances and other products are required to support wireless connection, remote control, voice interaction, and so on.

However, on voice interaction, due to design deficiency of a product, echo interference and environmental noise and reverberant interference in a remote usage scenario causes low recognition accuracy of a voice command of the product and poor interaction experience, and disables the product to respond to a user command timely.

SUMMARY

The disclosure is intended to provide a method for performing voice control to a piece of device with a microphone array and a piece of device with a microphone array, for solving the problem of low recognition accuracy of a voice command and poor interaction experience in the current solution.

To this end, the technical solutions of the disclosure are implemented as follows.

According to an aspect, the disclosure provides a method for performing voice control on a device with a microphone array, which includes the following steps.

It is confirmed that the device is in an audio playing state. An interference sound interfering the device in the audio playing state is analyzed to obtain a feature of the interference sound. A voice enhancement mode adopted by the device is selected according to the feature of the interference sound. A user's voice is detected in real time for a wake-up word. When the wake-up word is detected, the device is controlled to stop audio playing. An interference sound interfering the device after playing audios is stopped is analyzed to obtain a feature of the interference sound. The voice enhancement mode adopted by the device is adjusted according to the feature of the interference sound. A command word from a user is acquired to control the device to execute a corresponding function, so as to respond to the user.

According to another aspect, the disclosure provides a device with a microphone array, which includes a state confirming unit, a voice enhancement unit, a detection control unit and a function executing unit.

The state confirming unit is arranged to confirm that the device is in an audio playing state. The voice enhancement unit is arranged to analyze the interference sound interfering the device in the audio playing state to obtain a feature of the interference sound, and select the voice enhancement mode adopted by the device according to the feature of the interference sound. The detection control unit is arranged to detect the user's voice in real time for a wake-up word, and when the wake-up word is detected from the user's voice, control the device to stop audio playing. The voice enhancement unit is further arranged to analyze an interference sound interfering the device after the audio playing is stopped to obtain a feature of the interference sound, and adjust the voice enhancement mode adopted by the device according to the feature of the interference sound. The function executing unit is arranged to acquire a command word from the user to control the device to execute a corresponding function, so as to respond to the user.

From the above, in the technical solutions of the disclosure, on one hand, voice environments and use features of the device are analyzed. Voice enhancement is divided into two stages taking the wake-up word as the dividing point. Before and after the wake-up word is detected, different voice enhancement modes are adopted aiming at different sound environments to enhance a voice enhancement effect. Therefore, the voice command of the user can be detected more accurately and timely. On the other hand, when the wake-up word is detected, it is determined that the user has a new requirement at this point, then the device is controlled to stop playing the current audios and wait for a new user command, which not only further improves the recognition accuracy of the new command, but also conforms to a usage habit of the user. Therefore, products may have a more user-friendly design and obtain improved user experience.

DETAILED DESCRIPTION

For making the purposes, the technical solutions and the advantages of the disclosure more clear, embodiments of the present disclosure are further elaborated below in combination with the accompanying drawings.

Figure 1:
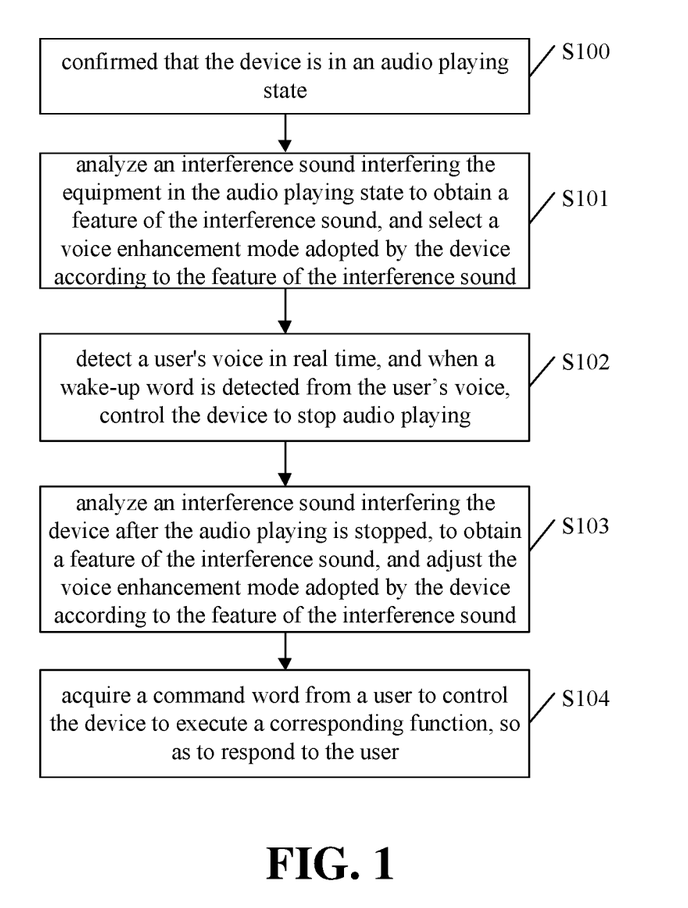
FIG. 1 is a flowchart of a method for performing voice control on a device with a microphone array according to an embodiment of the present disclosure.

An embodiment of the disclosure provides a method for performing voice control on a device with a microphone array. As shown in FIG. 1, the method includes the following steps.

In step S100, it is confirmed that the device is in an audio playing state.

For example, when it is detected that the device is playing music, it may be confirmed that the device is in an audio playing state.

In step S101, an interference sound interfering the device in the audio playing state is analyzed to obtain a feature of the interference sound, and a voice enhancement mode adopted by the device is selected according to the feature of the interference sound.

In step S102, a user's voice is detected in real time for a wake-up word, and when the wake-up word is detected from the user voice, the device is controlled to stop audio playing. For example, the user's voice is collected through the microphone array in the device. Analysis and feature extraction is performed on the collected voice to judge whether a wake-up word exists in the voice.

In step S103, an interference sound interfering the device after audio playing is stopped, is analyzed to obtain a feature of the interference sound, and the voice enhancement mode adopted by the device is adjusted according to the feature of the interference sound.

In step S104, a command word from a user is acquired to control the device to execute a corresponding function so as to respond to the user.

The order of performing the steps shown in FIG. 1 is only an example, and the embodiment is not limited to FIG. 1. For example, steps S102 and S103 can be performed at the same time, and detecting the user's voice in real time in S102 can be performed throughout the steps of S100 and S104.

Based on the embodiment shown in FIG. 1, furthermore, the voice enhancement mode adopted by the device may be selected according to a type and direction of the interference sound in steps S101 and S103.

The above steps from S100 to S104 can be performed by either an internal apparatus arranged in the device or an independent apparatus arranged outside the device.

The technical solution provided by another embodiment of the disclosure is described below. The technical solution includes the following steps.

In step S200, it is confirmed that the device is in an audio playing state.

For example, when it is detected that the device is playing music, it may be confirmed that the device is in the audio playing state.

In step S201, the interference sound interfering the device in the audio playing state is analyzed to obtain a feature of the interference sound, and the voice enhancement mode adopted by the device is selected according to the feature of the interference sound.

When the device performs audio playing, an echo is considered to be a factor which causes a relatively large interference on voice recognition, and the voice is drowned by the echo.

After it is confirmed that the type of the interference sound is an echo, voice recognition accuracy is improved by eliminating the echo. According to the present embodiment, a direction of the echo is calculated firstly. For example, the direction of the echo is acquired by calculating a delay of the echo between microphones of the microphone array. Parameters of the microphone array are adjusted according to the direction of the echo and beforming according to the adjusted parameters is performed on a voice signal collected by the device to eliminate the interference caused by the echo. The specific method about how to eliminate the echo by means of beamforming is not limited to the embodiment.

Furthermore, the present embodiment also provides a solution of combining two cascaded stages, namely beamforming and adaptive cancellation, to eliminate echo interference. Here, this cascaded processing may be implemented in at least two implementation modes.

A First Implementation Mode

After it is confirmed that the interference sound is an echo, beamforming is adopted to eliminate the echo firstly. That is, the direction of the echo is calculated, and the parameters of the microphone array are adjusted according to the direction of the echo. The beamforming according to the adjusted parameters is performed on the voice signal collected by the device, so as to obtain a first-stage processed signal.

Then, adaptive echo cancellation is performed on the first-stage processed signal to obtain a final voice signal free of the echo.

A Second Implementation Mode

After it is confirmed that the interference sound is the echo, adaptive echo cancellation is performed firstly on the voice signal collected by the device to obtain a first-stage processed signal. Then, the parameters of the microphone array are adjusted according to the direction of the echo. The beamforming according to the adjusted parameters is performed on the first-stage processed signal, so as to obtain a final voice signal free of the echo.

In step S202, the user's voice is detected in real time for a wake-up word. When the wake-up word is detected from the voice, the device is controlled to stop audio playing.

A voice signal of the user is collected through the microphone on the device in real time. The voice signal is detected to judge whether the wake-up word exists. The operation of detecting the user's voice may be performed throughout the running of the device.

The wake-up word, or called a hot word, in the present embodiment is used for waking up the device to execute the corresponding function. By presetting the wake-up word (and the command word) in the device and informing it to the user, the user can send the voice command through the wake-up word to control the device. The wake-up word (and the command word) may also be set by the user. In this case, the device receives information input by the user to learn the wake-up word (and the command word) to be used.

In the present embodiment, a corresponding relationship between the wake-up word and a corresponding control logic will be established. For example, the control logic may include controlling the device to stop audio playing. In this way, when the wake-up word is detected and it is determined that the user has a new requirement, it is stopped to perform audio playing. At this point, stopping the audio playing may facilitate clearly collecting the command word that the user will send subsequently. Furthermore, stopping the audio playing itself is a response to the command from the user, which conforms to a general habit of human communication, and thus generates improved user experience. Moreover, when playing audios is stopped, the device may be further controlled to make other responses. For example, an indicator light toward the user of the device is controlled to blink. For another example, for a movable device, the front side of the device is controlled to rotate to the direction toward the user; the device is controlled to move to the user, and so on.

The above control logic further includes that when it is confirmed that the wake-up word is detected, before the device is controlled to stop audio playing, other commands will not be recognized, and the voice command from the user will not be recognized and processed. After the audio playing is stopped, recognizing and processing the voice is restarted, and the device waits for the user command to be received. In this way, effective voice recognition may be further ensured.

In a step S103, an interference sound interfering the device after audio playing is stopped is analyzed to obtain a feature of the interference sound, and a voice enhancement mode adopted by the device is adjusted according to the feature of the interference sound.

After the device stops audio playing, an environmental noise and reverberation may be considered to be a factor which causes a relatively large interference on the voice recognition. That is, it is confirmed that the type of the interference sound is the environmental noise and the reverberation, and the voice recognition accuracy is improved by eliminating the environmental noise and the reverberation. In the present embodiment, the direction of the environmental noise is calculated firstly. For example, the direction of the environmental noise is acquired by calculating the a delay of the environmental noise between the microphones of the microphone array. The voice enhancement mode adopted by the device is adjusted into a noise and reverberation cancellation mode. The parameters of the microphone array are adjusted according to the direction of the environmental noise. Therefore, the interference caused by the environmental noise and the reverberation may be eliminated. How to eliminate the interference in the noise and reverberation cancellation mode can adopt the current solution, which is not strictly limited by the embodiment.

Note that, the direction of the reverberation cannot be calculated. The embodiment can achieve a technical effect of suppressing the reverberation by beamforming to suppress the direction of the environment noise.

In a step S104, a command word from the user is acquired to control the device to execute the corresponding function so as to responds to the user.

The command word includes commands of controlling built-in functions of the device, for example, which includes but not limited to the command of controlling the play volume of a speaker in the device, the command of controlling the device to move, the command of controlling an application program installed in the device, and so on.

With respect to the wake-up words, the number of command words is large, and the content of the command words is complex. In order to reduce the device load and improve the recognition accuracy, the command word may be processed in cloud according to the embodiment. After the device stops audio playing, the voice signal that the user sends after the wake-up word is collected. The voice signal is transmitted to a cloud server. The cloud server performs feature matching on the voice signal, and acquires the command word from the matched voice signal. The command word returned by the cloud server is received by the device, and the device is controlled to execute the corresponding function according to the command word, so as to correspondingly respond to the user From the above, in the embodiment, the voice enhancement is divided into two processing stages according to the recognition of the wake-up word, and different processing modes are adopted for the microphone array in the device, such that the recognition accuracy of the voice command is improved.

Figure 2:
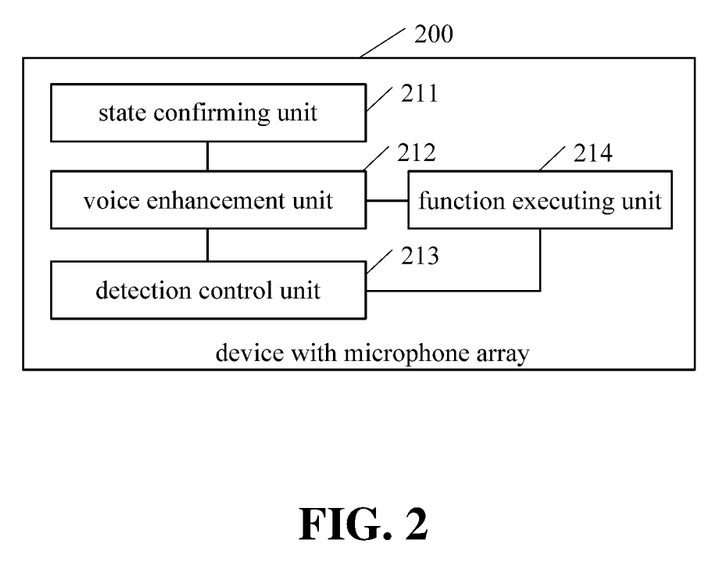
FIG. 2 is a structure diagram of a device with a microphone array according to another embodiment of the disclosure.

Another embodiment of the disclosure provides a device 200 with a microphone array. As shown in FIG. 2, the device 200 includes a state confirming unit 211, a voice enhancement unit 212, a detection control unit 213 and a function executing unit 214.

The state confirming unit 211 is arranged to confirm that the device is in an audio playing state.

The voice enhancement unit 212 is arranged to analyze the interference sound interfering the device in the audio playing state to obtain a feature of the interference sound, and select a voice enhancement mode adopted by the device according to the feature of the interference sound.

The detection control unit 213 is arranged to detect the user's voice in real time for a wake-up word, and when the wake-up word is detected from the user's voice, control the device to stop audio playing.

The voice enhancement unit 212 is further arranged to analyze an interference sound interfering the device after playing audios is stopped, to obtain a feature of the interference sound; and adjust the voice enhancement mode adopted by the device according to the feature of the interference sound.

The function executing unit 214 is arranged to acquire the command word from the user to control the device to execute the corresponding function and responds to the user.

Based on the embodiment shown in FIG. 2, the voice enhancement unit 212 selects the voice enhancement mode adopted by the device according to a type and direction of the interference sound. Specifically, the voice enhancement unit 212 determines that the interference sound interfering the device in the audio playing state is the echo; acquires the direction of the echo; adjusts the parameters of the microphone array according to the direction of the echo and performs beamforming to eliminate the interference caused by the echo. Specifically, the voice enhancement unit 212 calculates the direction of the interference sound (e.g. the echo or the environmental noise) by calculating a delay of the interference sound between the microphones of the microphone array when the direction of the interference sound is acquired.

Based on the operation, when a solution of adopting beamforming and adaptive filtering to eliminate the echo is adopted, the voice enhancement unit 212 is further arranged to, firstly adjust the parameters of the microphone array according to the direction of the echo and perform beamforming, according to the adjusted parameters, on the voice signal collected by the device to obtain a first-stage processed signal; and then perform the adaptive echo elimination on the first-stage processed signal. Alternatively, the voice enhancement unit 212 is further arranged to, firstly, perform adaptive echo cancellation on the voice signal to obtain a first-stage processed signal; and then adjust parameters of the microphone array according to the direction of the echo and perform beamforming, according to the adjusted parameters, on the first-stage processed signal to eliminate the interference in the first-stage processed signal.

Moreover, the voice enhancement unit 212 determines that the interference sound interfering the device after the audio playing is stopped is the environmental noise and the reverberation, acquires the direction of the environmental noise, adjusts the voice enhancement mode adopted by the device into the noise and reverberation cancellation mode, and adjusts the parameters of the microphone array according to the direction of the environmental noise to eliminate the interference caused by the environmental noise and the reverberation.

Figure 3:
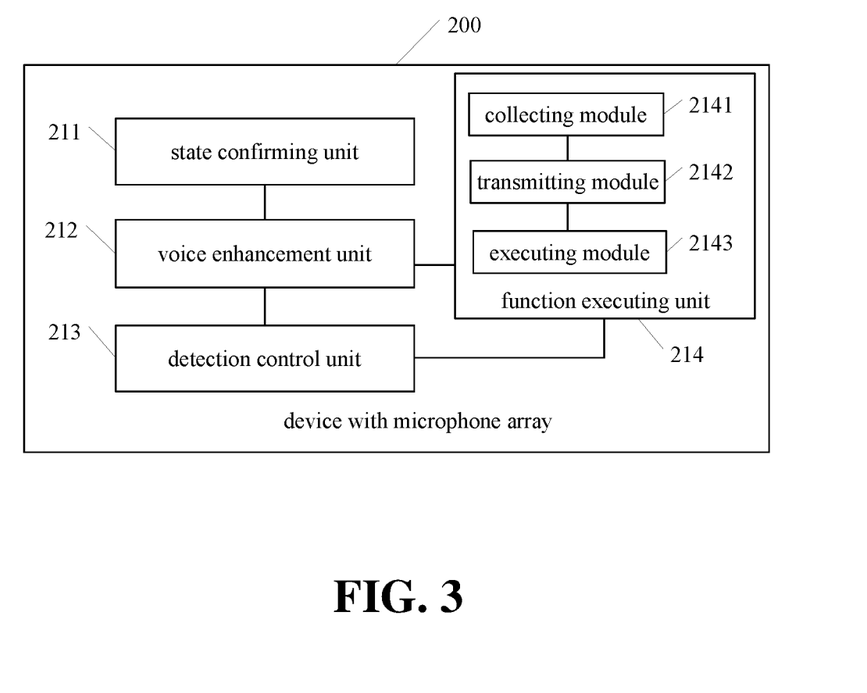
FIG. 3 is a structure diagram of another device with a microphone array according to another embodiment of the disclosure.

As shown in FIG. 3, the function executing unit 214 includes a collecting module 2141, a transmitting module 2142 and an executing module 2143.

The collecting module 2141 collects the voice signal that the user sends after the wake-up word. The collecting module 2141 can be separately set in the function executing unit 214, or, the function executing unit 214 can call a detecting function in the detection control unit 213 to collect the voice signal.

The transmitting module 2142 transmits the voice signal to the cloud server. The cloud server performs feature matching on the voice signal, acquires the command word from the matched voice signal, and receives the command word returned by the cloud server.

The executing module 2143 controls the device to execute the corresponding function according to the command word, so as to correspondingly respond to the user.

The device 200 with the microphone array can be intelligent portable terminals or intelligence household electrical appliances; the intelligent portable terminals at least include, but are not limited to, a smart watch, a smart phone or a smart speaker; the intelligence household electrical appliances at least include, but are not limited to, a smart television, a smart air-conditioner or a smart recharge socket.

The specific working mode of each unit in the embodiment of the device can refer to the related content of the embodiment of the disclosure, so it will not be repeated here.

Figure 4:
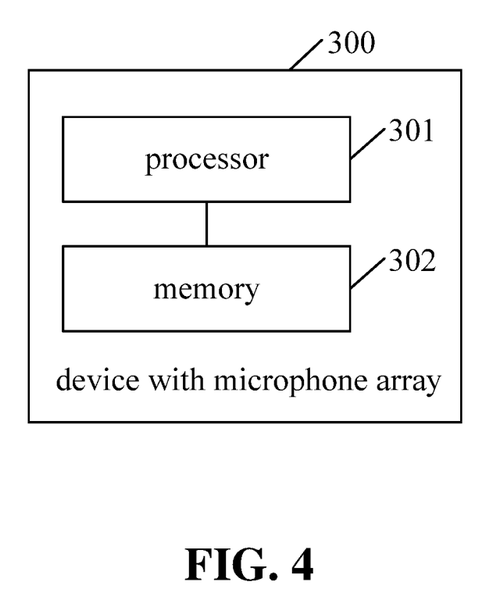
FIG. 4 is a structure diagram of another device with a microphone array according to an embodiment of the disclosure.

Another embodiment of the disclosure provides a device 300 with a microphone array. As shown in FIG. 4, the device 300 includes a processor 301 and a memory 302 storing a set of instructions executable for the processor. When the instructions are executed by the processor 301, the processor 301 is arranged to perform any one of the above methods.

From the above, in the technical solutions of the disclosure, on one hand, voice environments and user features of the device are analyzed. Voice enhancement is divided into two stages taking the wake-up word as the dividing point. Before and after the wake-up word is detected, different voice enhancement modes are adopted aiming at different sound environments to enhance a voice enhancement effect. Therefore, the voice command of the user can be detected more accurately and timely. On the other hand, when the wake-up word is detected, it is determined that the user has a new requirement at this point, then the device is controlled to stop playing the current audios and wait for a new user command, which not only further improves the recognition accuracy of the new command, but also conforms to a usage habit of the user. Therefore, products may have a more user-friendly design and obtain improved user experience.

Those ordinary skilled in the art can understand that all or a part of steps of the above embodiments can be performed by using a computer program flow. The computer program can be stored in a computer readable storage medium. The computer program, when executed on corresponding hardware platforms (such as system, installation, equipment and device) performs one of or a combination of the steps in the method.

Optionally, all or a part of steps of the above embodiments can also be performed by using an integrated circuit. These steps may be respectively made into integrated circuit modules. Alternatively, multiple modules or steps may be made into a single integrated circuit module.

The devices/function modules/function units in the above embodiment can be realized by using a general computing device. The devices/function modules/function units can be either integrated on a single computing device, or distributed on a network composed of multiple computing devices.

When the devices/function modules/function units in the above embodiment are realized in form of software function module and sold or used as an independent product, they can be stored in a computer-readable storage medium. The computer-readable storage medium may be an ROM, a magnetic disk or a compact disk.

The above is only the preferred embodiment of the disclosure and not intended to limit the disclosure. Any modifications, equivalent replacements, improvements and the like within the spirit and principle of the disclosure shall fall within the scope of protection of the disclosure.

The invention claimed is:

1. A method for performing voice control on a device with a microphone array, the method comprising:
   confirming that the device is in an audio playing state;
   analyzing an interference sound interfering the device in the audio playing state to obtain a feature of the interference sound, and selecting a voice enhancement mode adopted by the device according to the feature of the interference sound;
   detecting a user's voice in real time for a wake-up word, and when the wake-up word is detected from the user's voice, controlling the device to stop audio playing;
   analyzing an interference sound interfering the device after the audio playing is stopped, to obtain a feature of the interference, and adjusting the voice enhancement mode adopted by the device according to the feature of the interference sound; and
   acquiring a command word from the user, and controlling the device to execute a corresponding function so as to respond to the user.

2. The method according to claim 1, wherein selecting the voice enhancement mode adopted by the device according to the feature of the interference sound comprises:
   selecting the voice enhancement mode adopted by the device according to a type and direction of the interference sound;
   wherein, the type of the interference sound comprises at least one of an echo, an environmental noise and reverberation;
   wherein, the direction of the interference sound is acquired through calculating a delay of the interference sound between microphones of the microphone array.

3. The method according to claim 1, wherein selecting the voice enhancement mode adopted by the device according to the feature of the interference sound comprises:
   determining that the interference sound interfering the device in the audio playing state is an echo;
   acquiring a direction of the echo;
   adjusting parameters of the microphone array according to the direction of the echo, and performing beamforming, according to the adjusted parameters, on a voice signal collected by the device to eliminate the interference caused by the echo.

4. The method according to claim 3, further comprising:
   firstly, adjusting parameters of the microphone array according to the direction of the echo and performing beamforming, according to the adjusted parameters, on the voice signal collected by the device, to obtain a first-stage processed signal; and then performing adaptive echo cancellation on the first-stage processed signal; or,
   firstly, performing adaptive echo cancellation on the voice signal to obtain a first-stage processed signal; and then adjusting parameters of the microphone array according to the direction of the echo and performing beamforming, according to the adjusted parameters, on the first-stage processed signal to eliminate the interference in the first-stage processed signal.

5. The method according to claim 1, wherein, analyzing an interference sound interfering the device after the audio playing is stopped, to obtain a feature of the interference, and adjusting the voice enhancement mode adopted by the device according to the feature of the interference sound, comprises:
   determining that the interference sound interfering the device after the audio playing is stopped is an environmental noise and reverberation;

acquiring a direction of the environmental noise;
adjusting the voice enhancement mode adopted by the device into a noise and reverberation cancellation mode, and adjusting the parameters of the microphone array according to the direction of the environmental noise to eliminate interference caused by the environmental noise and the reverberation.

6. The method according to claim 1, wherein, acquiring a command word from the user, and controlling the device to execute a corresponding function so as to respond to the user, comprises:
collecting a voice signal issued by the user after the wake-up word;
transmitting the voice signal to a cloud server; performing, by the cloud server, feature matching on the voice signal; and acquiring the command word from the matched voice signal; and
receiving the command word returned by the cloud server, and controlling the device to execute the corresponding function according to the command word so as to respond to the user.

7. The method according to claim 1, wherein detecting a user's voice in real time for a wake-up word, and when the wake-up word is detected from the user's voice, controlling the device to stop audio playing, comprises:
when it is confirmed that the wake-up word is detected from the user's voice, recognizing and processing a voice command from the user after the device is controlled to stop the audio playing.

8. A device with a microphone array, the device comprising a processor and a memory for storing a set of instructions executable for the processor, wherein, when the instructions are executed by the processor, the processor is arranged to:
confirm that the device is in an audio playing state;
analyze an interference sound interfering the device in the audio playing state to obtain a feature of the interference sound, and select a voice enhancement mode adopted by the device according to the feature of the interference sound; further analyze an interference sound interfering the device after the audio playing is stopped to obtain a feature of the interference sound, and adjust the voice enhancement mode adopted by the device according to the feature of the interference sound;
detect a user's voice in real time for a wake-up word, and when the wake-up word is detected from the user's voice, control the device to stop the audio playing;
acquire a command word from the user, and control the device to execute a corresponding function so as to respond to the user.

9. The device according to claim 8, wherein, the processor is further arranged to:
select the voice enhancement mode adopted by the device according to a type and direction of the interference sound;
wherein, the processor is further arranged to determine that the interference sound interfering the device in the audio playing state is echo; acquire the direction of the echo; and adjust parameters of the microphone array according to the direction of the echo and perform beamforming based on the adjusted parameters to eliminate the interference caused by the echo; and
the processor is further arranged to determine that the interference sound interfering the device after the audio playing is stopped, is an environmental noise and reverberation; acquire the direction of the environmental noise; adjust the voice enhancement mode adopted by the device into a noise and reverberation cancellation mode; and adjust the parameters of the microphone array according to the direction of the environmental noise to eliminate the interference caused by the environmental noise and the reverberation.

10. The device according to claim 8, wherein the device is an intelligent portable terminal or an intelligence household electrical appliance;
the intelligent portable terminal comprises at least one of a smart watch, a smart phone or a smart speaker;
the intelligence household electrical appliance comprises at least one of a smart television, a smart air-conditioner or a smart recharge socket.

11. The device according to claim 8, wherein the processor is further arranged to:
select the voice enhancement mode adopted by the device according to a type and direction of the interference sound;
wherein, the type of the interference sound comprises at least one of an echo, an environmental noise and reverberation;
wherein, the processor is further arranged to acquire the direction of the interference sound through calculating a delay of the interference sound between microphones of the microphone array.

12. The device according to claim 8, wherein, the processor is further arranged to:
collect a voice signal issued by the user after the wake-up word;
transmit the voice signal to a cloud server; perform, by the cloud server, feature matching on the voice signal; and acquire the command word from the matched voice signal; and
receive the command word returned by the cloud server, and control the device to execute the corresponding function according to the command word so as to respond to the user.

13. The device according to claim 8, wherein the processor is further arranged to:
when it is confirmed that the wake-up word is detected from the user's voice, recognize and process a voice command from the user after the device is controlled to stop the audio playing.

14. The device according to claim 9, wherein the processor is further arranged to:
firstly, adjust parameters of the microphone array according to the direction of the echo and perform beamforming, according to the adjusted parameters, on the voice signal collected by the device, to obtain a first-stage processed signal; and then perform adaptive echo cancellation on the first-stage processed signal; or,
firstly, perform adaptive echo cancellation on the voice signal to obtain a first-stage processed signal; and then adjust parameters of the microphone array according to the direction of the echo and perform beamforming, according to the adjusted parameters, on the first-stage processed signal to eliminate the interference in the first-stage processed signal.

15. A non-transitory computer readable storage medium, in which a computer executable instruction is stored; the computer executable instruction being used for performing a method for performing voice control on a device with a microphone array, the method comprising:
confirming that the device is in an audio playing state;
analyzing an interference sound interfering the device in the audio playing state to obtain a feature of the interference sound, and selecting a voice enhancement mode adopted by the device according to the feature of the interference sound;

detecting a user's voice in real time for a wake-up word, and when the wake-up word is detected from the user's voice, controlling the device to stop audio playing;

analyzing an interference sound interfering the device after the audio playing is stopped, to obtain a feature of the interference, and adjusting the voice enhancement mode adopted by the device according to the feature of the interference sound; and acquiring a command word from the user, and controlling the device to execute a corresponding function so as to respond to the user.

16. The storage medium according to claim 15, wherein selecting the voice enhancement mode adopted by the device according to the feature of the interference sound comprises:

selecting the voice enhancement mode adopted by the device according to a type and direction of the interference sound;

wherein, the type of the interference sound comprises at least one of an echo, an environmental noise and reverberation;

wherein, the direction of the interference sound is acquired through calculating a delay of the interference sound between microphones of the microphone array.

17. The storage medium according to claim 15, wherein selecting the voice enhancement mode adopted by the device according to the feature of the interference sound comprises:

determining that the interference sound interfering the device in the audio playing state is an echo;

acquiring a direction of the echo;

adjusting parameters of the microphone array according to the direction of the echo, and performing beamforming, according to the adjusted parameters, on a voice signal collected by the device to eliminate the interference caused by the echo.

18. The storage medium according to claim 17, wherein the method further comprises:

firstly, adjusting parameters of the microphone array according to the direction of the echo and performing beamforming, according to the adjusted parameters, on the voice signal collected by the device, to obtain a first-stage processed signal; and then performing adaptive echo cancellation on the first-stage processed signal; or, firstly, performing adaptive echo cancellation on the voice signal to obtain a first-stage processed signal; and then adjusting parameters of the microphone array according to the direction of the echo and performing beamforming, according to the adjusted parameters, on the first-stage processed signal to eliminate the interference in the first-stage processed signal.

19. The storage medium according to claim 15, wherein, analyzing an interference sound interfering the device after the audio playing is stopped, to obtain a feature of the interference, and adjusting the voice enhancement mode adopted by the device according to the feature of the interference sound, comprises:

determining that the interference sound interfering the device after the audio playing is stopped is an environmental noise and reverberation;

acquiring a direction of the environmental noise;

adjusting the voice enhancement mode adopted by the device into a noise and reverberation cancellation mode, and adjusting the parameters of the microphone array according to the direction of the environmental noise to eliminate interference caused by the environmental noise and the reverberation.

20. The storage medium according to claim 15, wherein, acquiring a command word from the user, and controlling the device to execute a corresponding function so as to respond to the user, comprises:

collecting a voice signal issued by the user after the wake-up word;

transmitting the voice signal to a cloud server; performing, by the cloud server, feature matching on the voice signal; and acquiring the command word from the matched voice signal; and receiving the command word returned by the cloud server, and controlling the device to execute the corresponding function according to the command word so as to respond to the user.

* * * * *